United States Patent [19]

Phillips et al.

[11] 4,148,122
[45] Apr. 10, 1979

[54] METHOD FOR REPAIRING VEHICLE BODIES

[76] Inventors: James T. Phillips; Henry J. Kandl, both of 18831 Dixie Hwy., Homewood, Ill.

[21] Appl. No.: 850,957

[22] Filed: Nov. 14, 1977

[51] Int. Cl.$^2$ .............................................. B23P 7/00
[52] U.S. Cl. .................................... 29/401 E; 156/94; 264/36
[58] Field of Search ............. 29/401 R, 401 E, 401 B; 264/36, 46.6, 46.9; 156/94

[56] References Cited
U.S. PATENT DOCUMENTS

| 3,923,571 | 12/1975 | Aoki et al. | 156/94 X |
| 4,033,023 | 7/1977 | Slaughter et al. | 264/36 X |
| 4,049,480 | 9/1977 | Kutschke | 264/30 X |

*Primary Examiner*—Leon Gilden
*Attorney, Agent, or Firm*—John Vander Weit, Jr.

[57] ABSTRACT

A method for repairing holes and rust areas in automobile and truck bodies comprising the steps of identifying or providing a cavity behind the hole or rust area, filling said cavity with a moldable plastic material which will harden as a closed cell foam and provide a support base behind the hole or rust area, removing any hardened plastic support material on the surface of the body which does not conform to a desired body surface contour, applying a plastic filler to the area, the plastic filler being selected from the class consisting of a polyester resin and filler mixed with a catalyst or an epoxy resin and filler mixed with a catalyst, and grinding the surface of the plastic filler to a feathered edge at the surface of the metal surface.

6 Claims, 4 Drawing Figures

METHOD FOR REPAIRING VEHICLE BODIES

BACKGROUND OF THE INVENTION

1. Field of the Invention

The field of this invention relates to repairing holes and rusted areas of automobile and truck body panels.

2. Prior Art

A major problem concerning the typical automobile whose body is fashioned from sheet metal is that certain sections of the sheet metal body tend to rust away. This rusting causes the automobile to become unsightly, which can lead to the owner's disposing of the vehicle long before the mechanical parts wear out.

Coping with this problem has long been a challenge to those wishing to repair the automobile body.

The method of repairing automobile bodies has changed quite materially over a period of years. Some years ago, it was common practice to repair a dented surface or a hole in the body by flattening out the surface as well as possible by hand, and then applying molten lead to the metal surfaces after the paint had been removed. This molten lead adhered to the metal surface and was built up to a thickness sufficient to produce a smooth outer surface. The required area was sanded to provide a smooth continuous surface and the repaired area was then painted to the color of the original body.

This process of "leading" the injured areas, was not only time consuming, but it also required a relatively high degree of skill to accomplish good results. As a result, this method has fallen from general use and has been replaced by alternative methods.

The current methods of repairing rust damage fall into two categories which can be characterized as "temporary" and "semi-permanent."

The temporary method involves applying a pressure sensitive aluminum or stainless steel tape or a fiberglass patch over the damaged area, filling over this patch with a polyester filler, priming the area and painting it. This type of repair, while quick and inexpensive, will generally last only about six (6) months. Such a repair, therefore, provides only a temporary solution to the problem which is generally less than satisfactory.

The semi-permanent method involves fashioning a metal patch to cover the area in question, welding or riveting the patch in place, (or in some severe cases of rust, replacing the entire section with a new section), filling over the area with polyester filler, priming and painting.

This method does not generally provide a fully permanent repair since it does not correct the situation which caused the rust in the first place.

Rusting in an automobile is usually caused by dirt, salt and moisture becoming trapped in a crevice or boxed-in section of the automobile body, so that the body metal is kept constantly damp and susceptible to oxidation. Thus, the rusting process occurs from the backside of the body panels and it is obvious that patches on the surface of a panel do nothing to impede the resuting process and, therefore, such patches are classified as semi-permanent.

This method is less than satisfactory not only because it is semi-permanent, but also because it presents the following problems.

1. A fair amount of skill is required to fashion the metal patch so that it conforms to the original contours of the automobile body. In some instances such as the dog-leg area (the lower area where the rear fender meets the door) the compound curves are so complex that even skilled craftsmen have difficulty in consummating repairs.

2. Skill is also required in attaching the patch or replacement section to the automobile. The repair may be riveted or welded and care must be taken that the original contours are followed. Welding will most times cause metal to distort.

3. In most cases, the patch metal is fastened to the outside of the old metal. Thus a ridge, equal to the thickness of the patch material, is created. Since this ridge must be blended out so that the repair will be pleasing to the eye, the polyester filler must extend a relatively large distance from the repair. This necessitates that the paint be ground off a large area around the repair so that the polyester fill can be graded up to cover the patch and approximate the original contour.

4. Welding or riveting equipment is required.

In many instances, repair of rusted areas is so time consuming, and the cost of skilled craftsmen is so high that the labor cost will result in a price so high that such a repair is impractical.

Clearly, a method of repairing holes and rusted areas of automobile and truck body panels which is permanent, and requires less skilled labor is greatly needed.

SUMMARY OF THE INVENTION

This invention presents a novel method for effectively repairing automobile and truck body panels in a manner which is more permanent than the above-mentioned prior methods, and requires only minimal skills on the part of the repairer.

In its broad aspect, this novel method for repairing holes and rust areas in automobile and truck bodies comprises the steps of:

(1) identifying or providing a cavity behind the hole or rust area, (2) filling said cavity with a moldable plastic material which will harden and provide a support base behind the hole or rust area, (3) removing any hardened plastic support material on the surface of the body which does not conform to a desired body surface contour, (4) applying a plastic filler to the area, the plastic filler being selected from the class consisting of a polyester resin and filler mixed with a catalyst or an epoxy resin and filler mixed with a catalyst, and (5) grinding the surface of the plastic filler to a feathered edge at the surface of the metal surface.

DETAILED DESCRIPTION OF THE INVENTION AND ITS PREFERRED EMBODIMENTS

Figure 1:
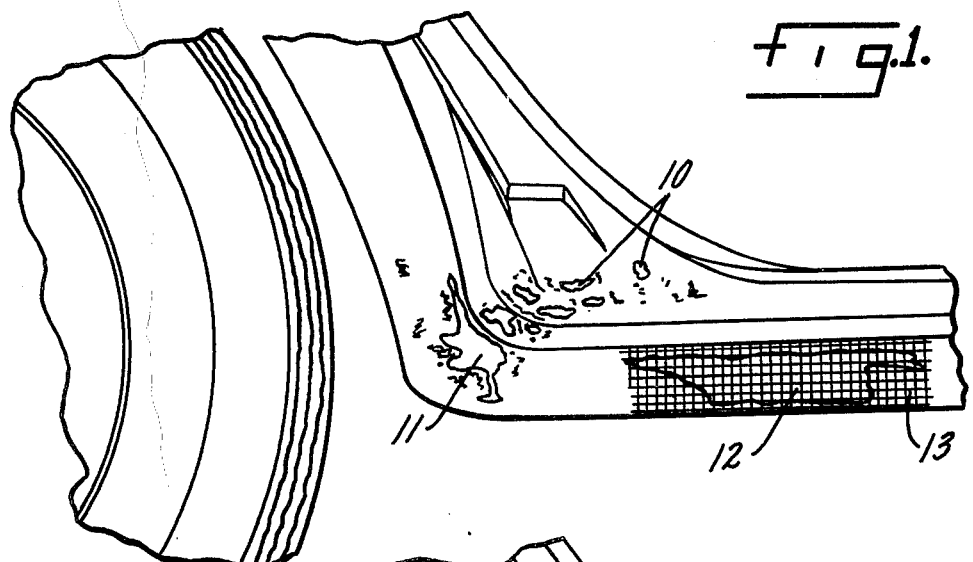
FIG. 1 presents a side view of an automobile body panel with holes and rust areas.

In its broad aspect, applicants' invention presents a method for repairing holes and rust areas in automobile and truck bodies which comprises the steps of:

(1) identifying or providing a cavity behind the hole or rust area, (2) filling said cavity with a moldable plastic material which will harden and provide a support base behind the hole or rust area, (3) removing any hardened plastic support material on the surface of the body which does not conform to a desired body surface contour, (4) applying a plastic filler to the area, the plastic filler being selected from the class consisting of a polyester resing and filler mixed with a catalyst, or an epoxy resin filler mixed with a catalyst, (5) grinding the surface of the plastic filler to a feathered edge at the surface of the metal surface.

Generally the holes or rust area of an automobile or truck will occur in locations which expose a defined cavity. If the hole or rust spot exposes a cavity volume which is unsuitably large or does not expose a defined cavity volume, a restricted defined cavity volume can be provided by fixing any suitably strong material about or over the exposed area to provide a suitable cavity. The most suitable materials will be strong, flexible, and easily affixed to the automobile body. Pressure sensitive aluminum adhesive tape is an example of such a material. Paperboard and tin sheets could also be used in defining or restricting the cavity area.

The cavity area exposed by holes or rust areas is then filled with any suitable moldable plastic material which will harden to provide a support base behind the hole or rust area.

Suitable moldable plastic materials are preferably resins which when hardened provide a rigid support which is a solid, or more preferably, a closed cell foam. More preferably, the hardened plastic material is inert to gasoline, moisture and other solvents and possesses extremely low shrinkage rates and is stable in the temperature range of $-20°$ F. to $150°$ F., and more preferably a temperature range of $-50°$ F. to $250°$ F.

Suitable plastic materials include, but art not limited to, polycarbonates, polyurethanes, polyesters, polystyrenes (which is less preferred because of poor resistance to gasoline), phenolics, etc. Although solid plastics can be used, a highly preferred aspect of this invention involves use of "foam in place" type plastics as these use much less plastic to fill a given volume and the expansion of the foam forces the plastic into any crevice which can aid in sealing the rust susceptible area and mechanically anchoring the support. The resulting hardended foam should be a rigid closed cell foam and most preferably is a rigid freon or $CO_2$ type blown polyurethane.

Specific examples of preferred $CO_2$ and freon blown polyurethane foams are as follows:

This formula will produce a $CO_2$ blown, closed cell polyurethane foam with a density of 10 to 12 lbs. per cubic foot. This material is employed when a high degree of structural strength is needed.

| Parts by Wt. | Material | Commercial Name |
|---|---|---|
| 100 | Polyether Polyol | Dow Voranol RH-360 |
| 1.9 | Silicone Surfactant | Dow Corning DC 193 |
| 1.1 | Amine Catalyst | Abbott Polycat 8 |
| .5 | Water | |
| 98 | Tolylene Diisocyanate | Upjohn PAPI |

This formula will produce a freon blown, closed cell polyurethane foam with a density of 4 to 5 lbs. per cubic foot. This material is used in those areas where structural strength is not as important. It also has the advantage of foaming sooner and adhering better to vertical and overhead surfaces.

| Parts by Wt. | Material | Commercial Name |
|---|---|---|
| 100 | Polyether Polyol | Dow Voranol RH-360 |
| 1.9 | Silicone Surfactant | Dow Corning DC 193 |
| 2.2 | Amine Catalyst | Abbott Polycat 8 |
| 13 | Freon II | Union Carbide NIAX 11 |
| 90 | Tolylene Diisocyanate | Upjohn PAPI |

The most suitable plastic materials are those which can be "worked like wood" after hardening, i.e., any excess can be chipped or sanded way.

Since the hardened plastic support protruding from the back side of the repaired area is not visible, only plastic protruding through the rusted area on the visible surface must be removed down to the original contour of the automobile. This can be done by chipping and/or grinding.

A conventional polyester plastic filler is then applied to the repair area in a conventional manner. Suitable plastic fillers are those of a type which are available for covering welded patches and the like, and may comprise polyester resin containing approximately 50% by weight of talc or other filler. Cobalt may be used as a hardener. This resin may be reacted with a material such as methyl ethyl ketone peroxide, benzyl peroxide or the like. This product dries to provide a very hard surface in a relatively short period of time.

After the plastic filler has hardened, the surface is carefully sanded so as to blend the surface with the surface of the automobile. If the grinding is carefully done, the patch is completely concealed and it is virtually impossible to detect the patched area when the method is complete. After grinding, the surface is painted in the usual manner, usually first with the application of an undercoat or primary coat, followed by an outer covering to match the finish of the vehicle.

Referring now to the drawings, FIG. 1 presents a side view of an automobile body panel with holes 10 and rust areas 11 and 12. Rust area 12 representing a large opening exposing a cavity is preferably covered with a mesh screen 13 which will desirably provide reinforcement of plastic support material.

Figure 2:
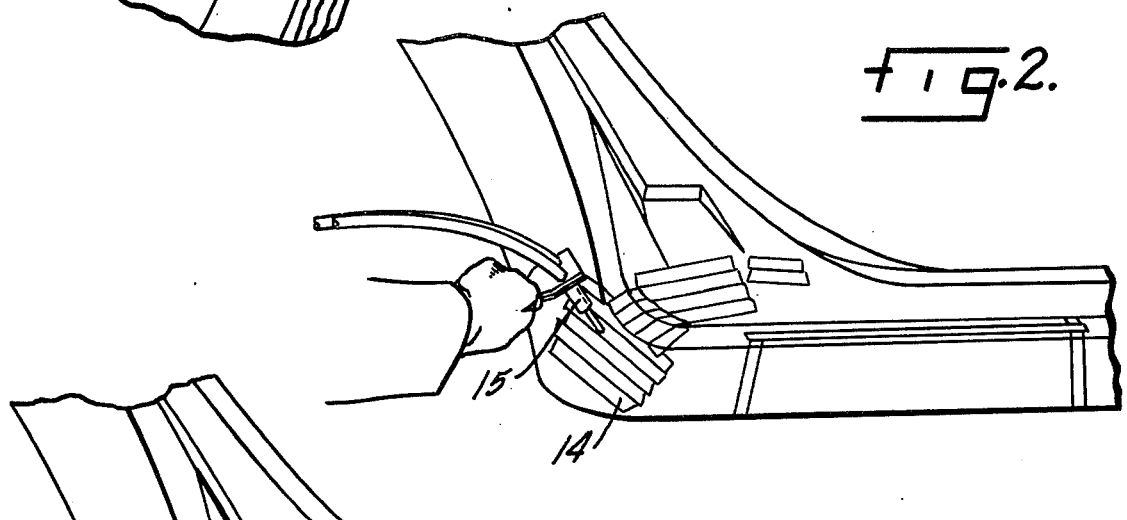
FIG. 2 illustrates a preferred aspect of the invention wherein the holes and rust expose a body cavity and openings to the cavity have been restricted with tape providing a more defined cavity for injection of plastic support material.
Figure 3:
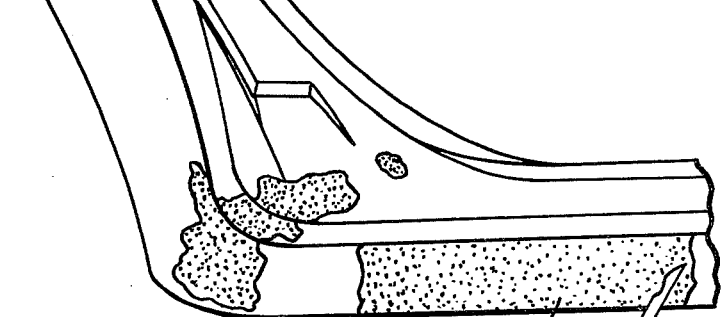
FIG. 3 illustrates an area after plastic support material has hardened and tape removed exposing excess plastic support material.
Figure 4:
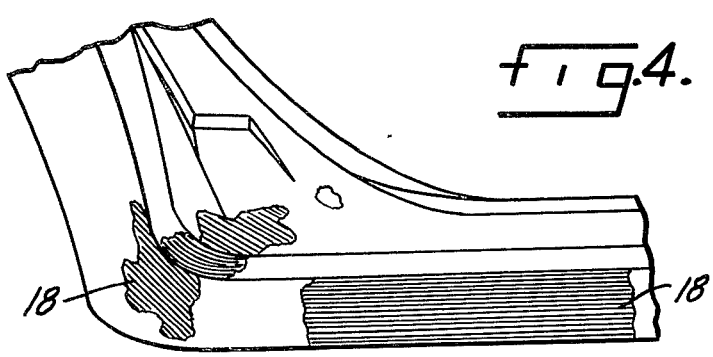
FIG. 4 illustrates an area after injection and finishing, and ready for painting.

FIG. 2 illustrates a preferred aspect of the invention wherein the cavity exposed by the holes and rust areas is better defined by sealing off the exposed area with a flexible adhesive tape 14. A suitable hole is provided in the tape to allow introducing a plastic support material into the cavity. Most suitably, the plastic material is a Freon or $CO_2$ blown rigid polyurethane introduced under pressure to the cavity via nozzle 15.

After the moldable plastic material has hardened, the tape is removed exposing the hardened rigid plastic support material. Excess plastic material 16 protruding above the surface contour of the vehicle body can be removed with cutting tool 17 or any other suitable apparatus.

After the removal of the excess plastic support material is completed, a conventional plastic filler is applied to and about the repair area in the conventional manner. This filler is then sanded to provide a hard smooth surface conforming to the body contours and provides finished repair area 18 ready for painting.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A method for repairing holes and rust areas in automobile and truck bodies comprising the steps of:
   (1) identifying or providing a cavity behind the hole or rust area,
   (2) filling said cavity with a moldable plastic material which will harden as a closed cell foam and provide a support base behind the hole or rust area,
   (3) removing any hardened plastic support material on the surface of the body which does not conform to a desired body surface contour,
   (4) applying a plastic filler to the area, the plastic filler being selected from the class consisting of a polyester resin and filler mixed with a catalyst or an epoxy resin and filler mixed with a catalyst, and
   (5) grinding the surface of the plastic filler to a feathered edge at the surface of the metal surface.

2. The method of claim 1 wherein moldable plastic material is a type which hardens to a solid material.

3. The method of claim 1 wherein the moldable plastic material is a foam in place type plastic material which hardens as a closed cell foam.

4. The method of claim 3 wherein the moldable plastic material is a $CO_2$ blown polyurethane.

5. The method of claim 3 wherein the moldable plastic material ia a freon blown polyurethane.

6. The method of claim 3 wherein the area of a hole or rust area exposing a cavity is restricted before filling said cavity with the moldable plastic material.

* * * * *